United States Patent [19]

Jensen

[11] 4,300,583
[45] Nov. 17, 1981

[54] HYDRAULIC BOOSTER VALVE

[75] Inventor: Kenneth D. Jensen, Owosso, Mich.

[73] Assignee: Midland-Ross Corporation, Cleveland, Ohio

[21] Appl. No.: 102,882

[22] Filed: Dec. 12, 1979

[51] Int. Cl.³ .................... F16K 31/12; F15B 13/10
[52] U.S. Cl. .......................... 137/101; 60/547 A; 91/391 R
[58] Field of Search .......... 137/101; 60/547 R, 547 A, 60/547 B, 548; 91/391 R, 548, 371, 372, 422

[56] References Cited

U.S. PATENT DOCUMENTS

| | | | |
|---|---|---|---|
| 3,093,119 | 6/1963 | Stelzer | 91/391 R |
| 3,532,027 | 10/1970 | MacDuff et al. | 91/371 |
| 3,625,113 | 12/1971 | Euler | 91/391 R |
| 3,728,942 | 4/1973 | Brown, Jr. | 91/469 |
| 3,733,966 | 5/1973 | Brown, Jr. | 91/372 |
| 3,796,134 | 3/1974 | Kaptrosky | 91/391 R X |
| 3,845,693 | 11/1974 | Meyers | 91/371 |
| 3,967,538 | 7/1976 | Thomas | 91/422 X |
| 3,979,912 | 9/1976 | Kuromitsu | 91/391 R X |

Primary Examiner—William R. Cline
Attorney, Agent, or Firm—Richard A. Negin

[57] ABSTRACT

The present invention is a gain valve for a hydraulic booster which allows transition from a manual braking mode to a power assist braking mode without the control called for in the manual mode immediately applied when the power assist function begins to operate. This is accomplished by a bypass passage through the gain valve piston which prevents a pressure increase in the hydraulic booster for power assisted braking. The bypass passage automatically opens and resets in response to system pressures.

9 Claims, 4 Drawing Figures

HYDRAULIC BOOSTER VALVE

BACKGROUND OF THE INVENTION

This invention is in the field of hydraulic boosters and, more particularly, relates to a valve for a hydraulic booster which maintains braking control when going from manual to power braking modes.

Hydraulic boosters are known in the art and are commonly used to assist in motor vehicle braking, i.e., power brakes. Generally, the hydraulic boosters operate in a motor vehicle using fluid from a power steering pump fed into the booster inlet. The power steering fluid pressure is increased in the booster. The increased pressure is transmitted from the booster to a braking means, such as a master cylinder.

Hydraulic boosters have a housing or casing which has an inlet in communication with the power steering pump and an outlet in communication with the power steering gear. A push rod is operatively connected to a brake pedal. When the brake pedal is depressed, the push rod causes a demand or gain valve to restrict a gap in a channel in the hydraulic booster communicating between the power steering pump and the power steering gear so as to cause an increase in pressure between the power steering pump and the restricted gap. The push rod causes a hub piston which is in a sliding relationship with the housing to move into the housing during braking. The movement of the hub piston affects a booster control valve having an inlet valve and an exhaust valve. The inlet valve opens to the higher pressure channel between the power steering pump and the restricted gap caused by the movement of the gain valve. The exhaust valve closes and a power chamber between the hub and a booster piston receives the high pressure fluid. The pressure forces the booster piston, which is in slidable relationship with the housing, to move. The movement of the booster piston applies a force to a braking means, such as a master cylinder, causing the brakes to be applied. When the brakes are released, the exhaust valve opens and the pressure in the power chamber decreases. Suitable means such as a return spring forces the hub and booster piston to return to a neutral or nonbraking position.

During normal operations, the hydraulic booster provides power assist to the operator of the vehicle in applying the brakes. Alternate embodiments of the basic hydraulic booster have been developed for unusual circumstances. Examples of some of these are shown in U.S. Pat. Nos. 3,093,119; 3,532,027; 3,625,113; and 3,979,912. These patents provide embodiments added to hydraulic boosters to compensate for sudden stopping, loss of braking pressure, prevention of blockage of power steering by limiting the pressure of the hydraulic booster below the maximum system pressure, and control of brake pedal travel.

An unusual circumstance occurs when the operator for some reason loses power from the power steering pump and is operating the brakes manually. During manual operation, the operator uses more force on the brake pedal than during power steering operation to attain an equal amount of braking of the vehicle. The valve settings are in a position which would result in greater pressures from the power assist mode than necessary to achieve a desired braking. Should the power steering pump suddenly start, a surge of high pressure fluid would enter into the hydraulic booster resulting in greater braking than intended. This causes sudden stopping or braking and attendant disadvantages including lurching forward of the load and the occupants within the vehicle. An example of such an occurrence occurs when the brakes are applied with the power assist functioning. The engine then stalls or is turned off for some reason. The vehicle is still rolling and is now under the influence of the brakes in a manual mode. Should the operator restart the engine while the vehicle is still in motion and his foot is pushing against the brake pedal, the force which he is using in manual mode will now be used in a power assist mode causing more braking than intended. When this happens in actual practice, the brakes suddenly lock and vehicle deceleration may be excessive.

U.S. Pat. No. 3,625,113 addresses this problem of sudden application of the power assist feature of the hydraulic booster when the brakes are used in the manual mode through the hydraulic piston. The approach used in this patent is the use of an additional seal and sliding element, reference character 42, used within the hydraulic brake booster. A bypass through the piston assembly is created to avoid increased pressure in chamber 38 which is used in power assisted operation. Element 42 used to solve this problem results in the use of another moving piece within the hydraulic booster requiring a significant modification to the other parts of an existing booster. Further, it requires another sealing location. It is desirable to avoid the sudden application of the power assist mode by the hydraulic booster when in manual mode, with minimum modification to existing types of hydraulic booster valves and without the necessity of adding another element and seal.

SUMMARY OF THE INVENTION

The present invention is a gain valve for a hydraulic booster which allows transition from a manual braking mode to a power assist braking mode without the control called for in the manual mode immediately applied when the power assist function begins to operate. The gain valve comprises a housing having a front end and a back end. A first chamber is located toward the front end of the housing and communicates to a pumping means and a second chamber, adjacent to the first chamber, communicates to a downstream low pressure line. A gain valve piston having a front end directed to the first chamber is located within a gain valve bore which is adjacent to the second chamber and closed at the back end. There is a means to bias the gain valve piston in a direction toward the front end of the housing and a pressure response pressure limiting means which can limit the movement of the piston toward the front of the housing. There is a path from the pumping means, through a front inlet in the gain valve housing to the first chamber, through a restriction or gap between the first chamber, the second chamber and the piston, to an outlet from the gain valve housing to a downstream line. The booster control portion of the hydraulic booster is connected in a line, from the path between the pumping means to the inlet, to a back end inlet into a back end chamber in the gain valve housing between the closed end of the bore and the back portion of the piston. A sealing means is between the front and back portions of the piston. The piston has a cross-sectional geometry which enables it to be slidingly received in the first and second chambers.

A passage is within the gain valve piston connecting a front end piston opening and a sidewall piston opening. The sidewall piston is located between the front end of the piston and the sealing means, which is between the front end and the back end of the piston, and at a distance from the front end of the piston so that during manual operation of the brakes the sidewall opening communicates with the second chamber. The bypass passage automatically opens and resets in response to system pressures.

It is an object of the present invention to provide a means to prevent sudden application of the power assist mode in a hydraulic booster when hydraulic pressure has been lost and suddenly reinstated. It is an object of the present invention to attain the above object without additional parts by the feature of a bypass passageway through the gain valve piston. It is the general object of the present invention to provide a safe hydraulic booster which compensates for changes from manual to power braking with minimum effect on the vehicle or the occupants. An advantage of the present invention is its use in a hydrostatically controlled gain valve, without the use of mechanical connections to open the bypass passageway.

It is an object of this invention to obtain one or more of the objects set forth above. These and other objects and advantages of this invention will become apparent to those skilled in the art from the following specification and claims reference being had to the attached drawings.

BRIEF DESCRIPTION OF THE DRAWINGS

Corresponding elements in FIGS. 1 through 4 have the same reference characters.

DESCRIPTION OF THE PREFERRED EMBODIMENTS

Figure 1:
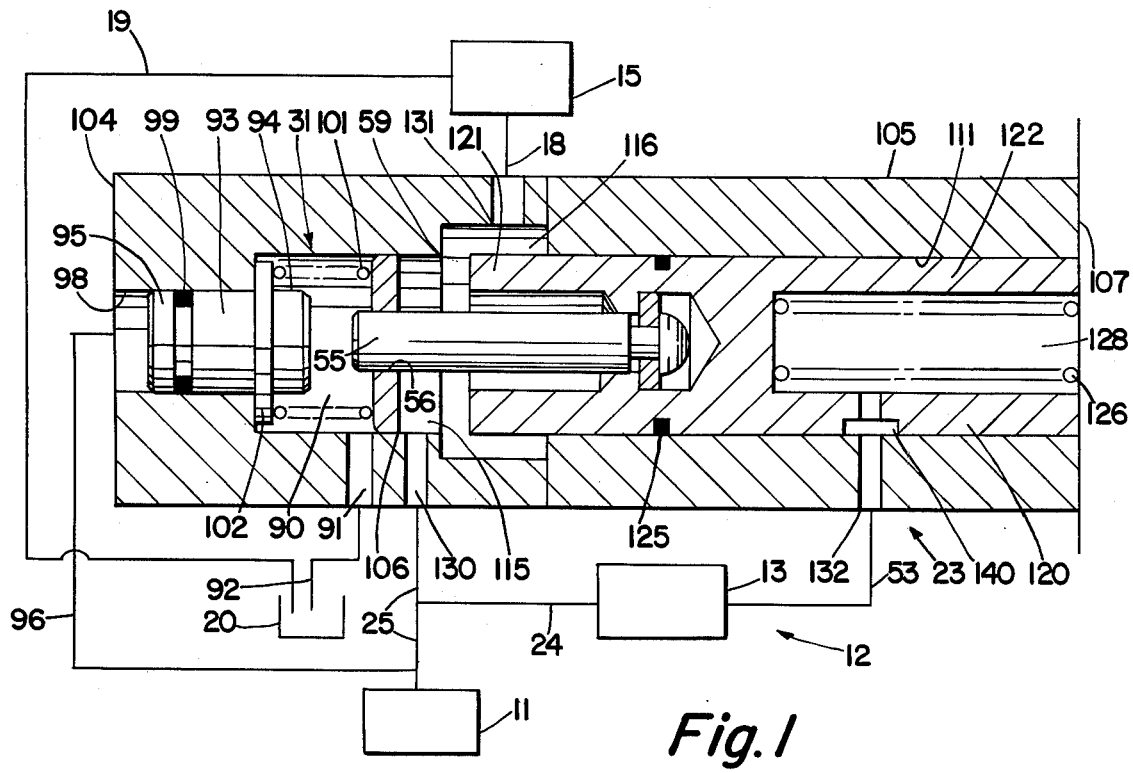
FIG. 1 is a schematic diagram showing a hydraulic booster containing a gain valve and a pressure response pressure limiter without the improvement of the present invention.

The present invention will be understood by those skilled in the art by reference to FIGS. 1-4 which are schematic views of a hydraulic booster 12 having a booster control portion 13 and a gain valve 23 with a pressure response pressure limiter means. The gain valve 23 and pressure limiter are shown in detail. The hydraulic booster used to illustrate the present invention is for use with a power braking system in a motor vehicle. However, the present invention can be used for this or other hydraulic booster systems.

The hydraulic booster 12 operates to cause an increase of pressure in the booster control portion 13 which acts on a braking means such as a master cylinder. This increase of pressure can be caused by the demand or gain valve generally shown at 23. During power assist operation when the brake is not used, valve means in the booster control portion 13 close so that no fluid is passing from pump 11 through booster control line 24 into the booster control portion 13. The power steering pump 11 feeds fluid through pump line 25, the gain valve 23, and line 18 to the power steering gear 15. The fluid flows from power steering gear 15 through line 19 to a pump reservoir 20 for the power steering pump 11. When the brake is not applied, the system operates with the power steering fluid circulating as if the hydraulic booster 12 was not in the system.

The gain valve 23 has a gain valve housing 105 which has a front end 104 and a closed back end 107. There is an inlet 130 through gain valve housing 105 which is connected to pump line 25. The inlet passage 130 is connected to a first chamber 115 within housing 105. Preferably, first chamber 115 is cylindrical having its axis along or parallel to the axis of housing 105. Adjacent to first chamber 115 and connected to it is a second chamber 116 which preferably is cylindrical, has a common axis with the first chamber 115 and has a greater sectional area than the first chamber 115. There is a cylindrical gain valve bore 111 adjacent to second chamber 116 and having a common axis with second chamber 116. Outlet passage 131 passes from the second chamber through the gain valve housing 105 to line 18.

A gain valve piston 120 is slidingly located in the gain valve bore 111. The piston 120 has a front portion 121 and a back portion 122 with the front portion directed toward the front end 104 and the back portion directed toward the back end 107. Preferably, the piston 120 has a cylindrical sidewall and a diameter which is slightly less than the diameter of the cylindrical gain valve bore 111.

There is a sealing means between the gain valve bore 111 wall and the sidewall of piston 120 located between the front portion 121 and back portion 122 such as O-ring 125. A back end chamber 128 is between the back portion 122 of the piston 120 and the back end 107 of the gain valve housing 105. Further, there is a means to bias the piston 120 toward the front end 104 of the gain valve housing 105. Preferably, the piston 120 is biased by a piston spring 126 located between the closed end 107 of the housing 105 and the back portion of the gain valve piston 120 in the back end chamber 128 as shown.

The hydraulic booster 12 has a fluid pumping means such as power steering pump 11. Power steering pump 11 is connected through pump line 25, to front inlet 130 into the first chamber 115 of gain valve housing 105. Outlet 131 from the second chamber 116 of the gain valve housing 105 is connected to downstream line 18 which can lead to a power steering gear 15. Booster control portion 13 is connected to a booster side inlet passage 132 by booster line 53. The booster side inlet passage 132 passes through housing 105 to back end passage 140 and into back end chamber 128.

A stem 55 is connected to the front portion 121 of gain valve piston 120 parallel to the axis of the piston 120 and preferably along the axis of the piston 120. The end of the stem 55 opposite the connection to the gain valve piston 120 slidingly passes through a stem hole 56 through first chamber partition such as first chamber wall 106. A sealing means such as an O-ring or a labyrinth seal can be between stem 55 and the stem hole 56.

Figure 3:
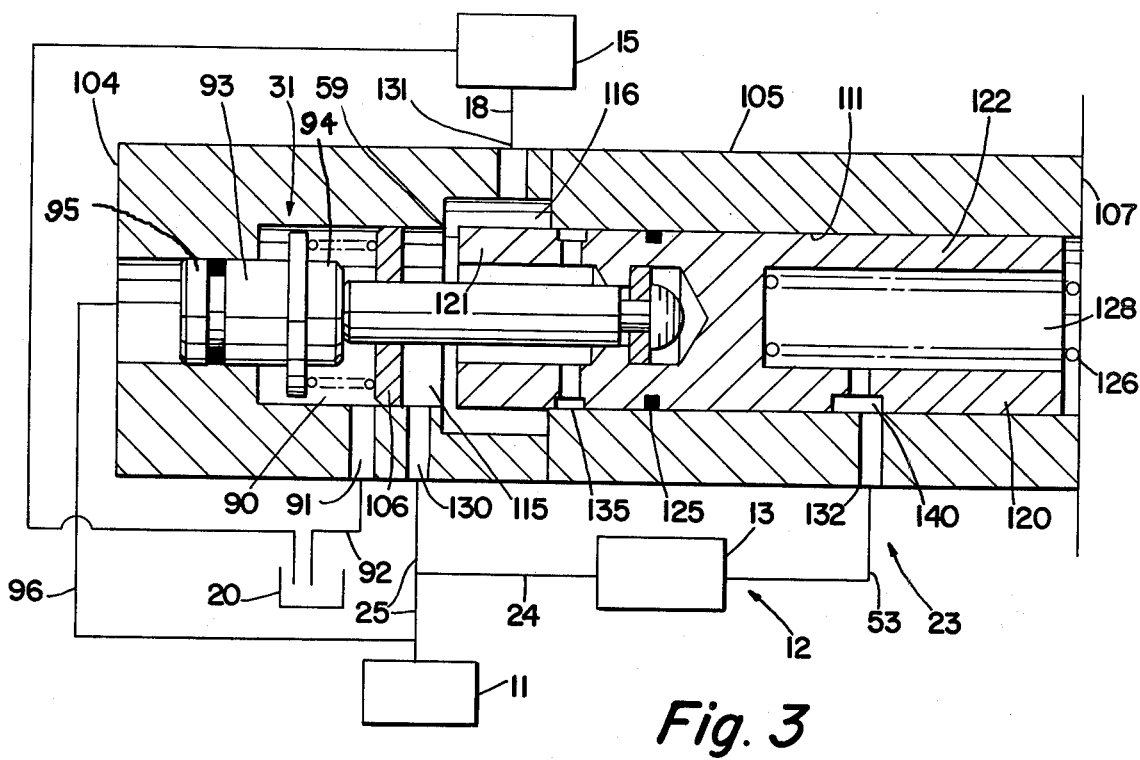
FIG. 3 is a schematic diagram showing the position of the gain valve containing the present invention during power assisted braking when the pressure limiter has been engaged.

Referring to FIG. 1, the hydraulic booster 12 is in a no braking or low power assist mode. The gain valve 23 is shown without the improvement of the present invention. When booster control portion 13 is activated by the operator stepping on a brake pedal, the gain valve piston 120 is forced toward the first chamber 115 causing gap 59 to become restricted as shown in FIG. 3. This increases the pressure between the power steering pump 11 and gap 59. The pressure is, therefore, increased in lines 24, 25 and 53 as well as in booster control portion 13 to provide power assistance to the braking.

The gain valve has a pressure limiter means associated with it. A pressure limiter is a device used in hydraulic boosters to limit the pressure increase created by the gain valve of the hydraulic booster to below a predetermined value. The preferred hydraulic booster used in the present invention has a pressure response pressure limiter, that is, a pressure limiter which limits the system pressure in response to the pressure in the system, such as pressure limiter 31 shown in FIGS. 1 through 4. Pressure limiter 31 prevents the pressure between gap 59 and power steering pump 11 from increasing to more than a predetermined value.

The pressure limiter 31 has a pressure limiting chamber 90 within gain valve housing 105. Preferably, pressure limiting chamber 90 is a bore in which there is a pressure limiting piston 93 which moves axially within the pressure limiting chamber 90. The pressure limiting piston 93 has a front portion 95 and a back portion 94. The front portion 95 communicates through a line 96 with the power steering pump 11. Preferably, front portion 95 extends in a sliding relationship into a pressure limiting bore 98 through the front end 104 of the gain valve housing 105 and is connected to line 96 which is connected to pump line 25. There is a sealing means between the sidewall of piston 93 and pressure limiting bore 98 which seals the front portion 95 within bore 98 from the back portion 94, such as O-ring 99 or labyrinth seals which are a plurality of grooves which trap fluid and minimize the effects of frictional force. There is a spring means such as pressure limiter spring 101 which biases piston 93 toward the front end 104 of the gain valve housing 105 and into bore 98. Pressure limiting chamber 90 is in communication with the low pressure reservoir 20 through pressure limiting chamber passage 91 and pressure limiting chamber line 92.

Figure 2:
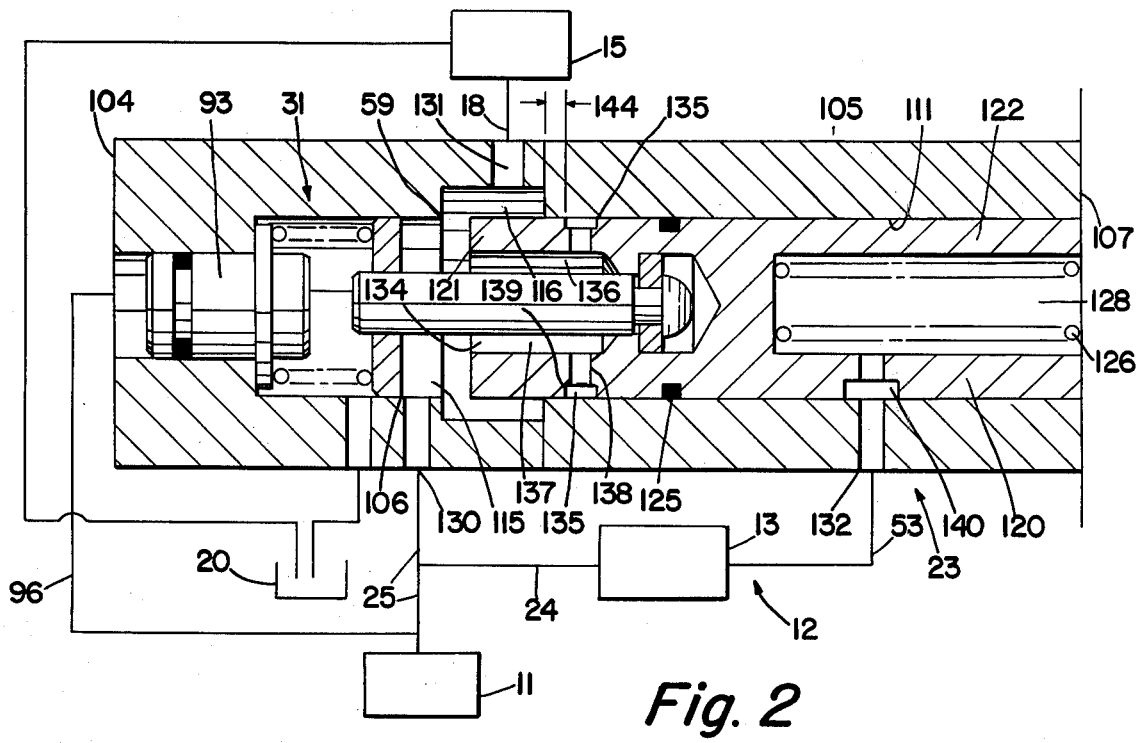
FIG. 2 is a schematic diagram showing the position of the gain valve containing the present invention when there is no braking or low pressure braking present.

Referring to FIGS. 1 and 2, the pressure limiter is shown in a position when there is no braking action through booster control portion 13 or the pressure limiter is not being used. In this mode, the pressure limiter is biased toward the front end 104 of housing 105. There is suitable means to stop the piston 93, such means can be a step within pressure limiting bore 98 or extension 102 intersecting with the wall surrounding bore 98. Spring 101 is designed to be fully extended in this mode. Spring 101 extends between extension 102 on piston 93 and a stop means such as nonmovable bushing on the side of first chamber wall 106 in the pressure limiting chamber 90. Gain valve stem 55 extends from the gain valve piston 120, through stem hole 56, axially into pressure limiting chamber 90.

When the brake is actuated at low pressures, gap 59 in the gain valve becomes restricted and the pressure in the system between gap 59 and the power steering pump 11 increases accordingly. Pressure limiting line 96 transmits this pressure to the front portion 95 of pressure limiting piston 93 forcing it toward the right against spring 101. At the same time, the gain valve piston 120 is moving toward the left thereby moving gain valve stem 55 toward the left. The gain valve continues to increase the hydraulic booster pressure until stem 55 and back end 94 of the pressure limiting piston 93 intercept as shown in FIG. 3. The pressure limiting device begins to limit the system pressure upon the intersection of the gain valve stem 55 and the back end 94 of pressure limiting piston 93. Spring 101 is designed so that the forces of the fluid against the front end 95 of pressure limiting piston 93, and the force through the booster control portion 13 on the back portion 122 of gain valve piston 120 forcing stem 55 against the back portion 94 of the pressure limiting piston 93 causes the gain valve piston 120 to stop moving at a predetermined pressure thereby achieving a desired pressure limit in the gain valve 23 and maintaining flow through the gap 59 to the power steering gear 15.

A drawback in the system as shown in FIG. 1 is that if the pressure in the system between power steering pump 11 and gap 59 fails for any reason such as stalling of the engine or failure of the power steering pump, the braking system goes into a manual mode. If the vehicle continues to roll and the manual braking mode continues to be in operation, a sudden restarting of the engine and/or the pump causes a sudden increase in pressure between the pump 11 and gap 59. This results in a surge of pressure to booster control portion 13 and causes a greater braking action due to the relative position of the components than during their use in the manual mode. This uncalled for increase in braking can cause vehicle damage or passenger injury. The present invention provides a means to maintain the manually controlled braking should the pressure in the system suddenly be reinstated.

Figure 4:
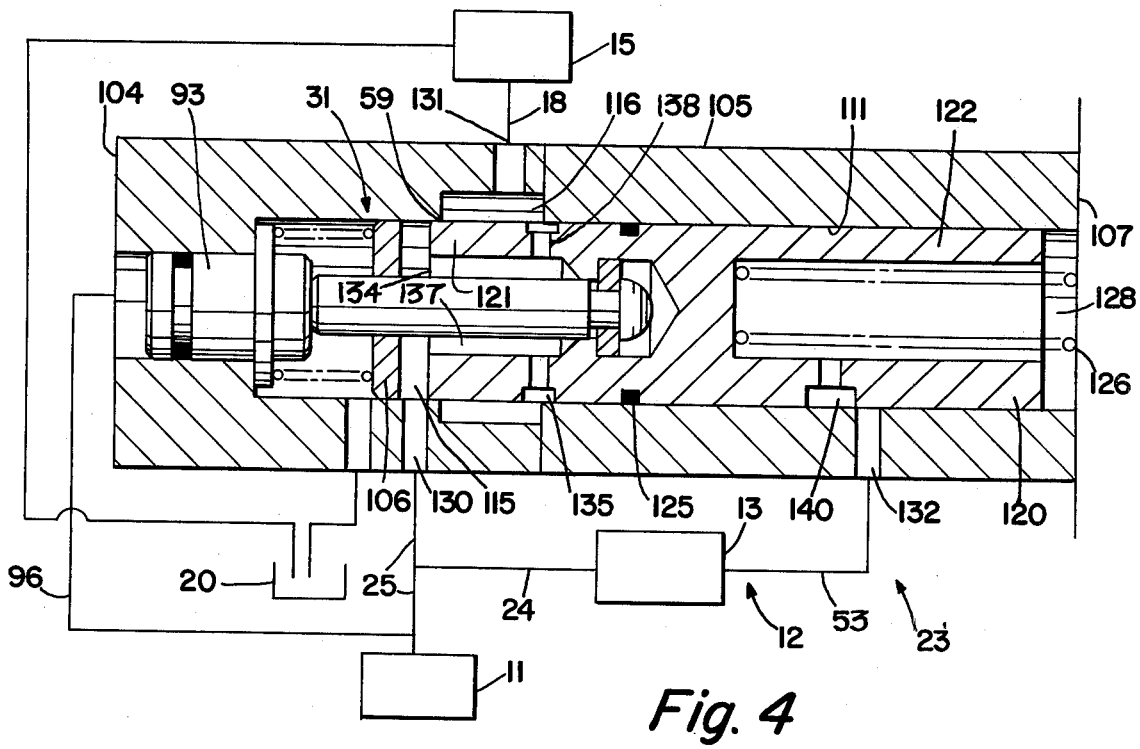
FIG. 4 is a schematic diagram showing the position of the gain valve containing the present invention during manual braking.

In the present invention, as shown in FIGS. 2, 3 and 4, the gain valve piston 120 has a sectional view or geometry transverse to the axis of the gain valve which enables it to be slidingly received in the first chamber 115 and second chamber 116. Preferably, the diameter of a cylindrically shaped piston 120 is slightly less than the diameter of the bore 111; and the first chamber 115 and the second chamber 116 have a common axis with the bore. The first chamber 115 is preferably cylindrical having a diameter approximately equal to that of the bore 111 and slightly greater than that of the piston 120. The second chamber 116 has a diameter which is greater than that of the first chamber 115. The second chamber need not be cylindrical although a cylindrical second chamber is preferred and more easily manufactured.

The gain valve piston 120 has a front end opening 134 and a sidewall opening 135. There is a passage 136 within the piston 120 connecting the front end opening 134 and the sidewall opening 135. Preferably, the passage within the piston comprises an axial passage 137 from the opening in the front end which connects to a radial passage 138 from the sidewall opening 135. The radial passage can be a single diameter hole from the piston 120 sidewall connecting to the axial passage 137. Preferably, the radial passage comprises a sidewall passage 139 from the sidewall opening 135 of the piston 120 to the radial passage 138. The sidewall passage 139 has a greater axial length than the diameter of the radial passage 138 which can be axially centered within the sidewall passage 139. The sidewall passage 139 can be a recess completely or partially around the circumference of the piston 120. There is a sidewall sealing land 144 between the inner wall of the bore 111 and the gain valve piston 120 located between the back end of the second chamber 116 and the sidewall passage 139. This sealing land 144 prevents the leakage of fluid from the second chamber 116, between the piston 120 and the bore 111 into sidewall opening 135 when sidewall passage 139 does not overlap second chamber 116.

The axial distance of the front side of the sidewall passage 139 to the front end of the gain valve piston 120 must be sufficient so that sidewall opening 135 is substantially sealed from the second chamber 116 when the system is operating at any amount of power assist braking with the hydraulic booster piston. In this way, during normal operation with power assist, there is a minimum amount of fluid passed through the passage 136 of the present invention.

The sidewall opening 135 is designed to intersect with second chamber 116 during manual operation by the proper sizing of piston spring 126 and the necessary axial location of sidewall opening 135 in gain valve piston 120.

The operation of the present invention can be seen by referring to FIGS. 2-4. In FIG. 2, the system is shown where there is no braking or very low braking with the pressure limiter 31 not yet being engaged. The sealing land 144 is between sidewall opening 135 and second chamber 116 substantially preventing flow through passage 136.

FIG. 3 shows a system in normal power assisted braking mode. A restriction is caused at gap 59 of gain valve 23 increasing the pressure between pump 11 and the gap 59. The pressure increase is transferred through pump line 25, and booster control line 24 to booster control portion 13, to back end chamber 128 as well as through pump line 25 through pressure limiting line 96 to the front 95 of pressure limiting piston 93 causing the back portion 94 of pressure limiting piston 93 to engage stem 55 of gain valve piston 120. The sealing land 144 is between sidewall opening 135 and second chamber 116 substantially preventing flow through passage 136. The normal power assist operation is, therefore, unaffected by passage 136.

Should the pressure in the system fail for any reason such as stalling of the engine or failure in the power steering pump 11, the manual mode is used to engage the brakes. In this mode, there is no pressure increase in the system from between the power steering pump 11 and gap 59. Referring to FIG. 4, the first chamber 115 and the second chamber 116 are sized so as to slidingly receive the gain valve piston 120. Piston spring 126 forces piston 120 toward the front of housing 105 since there is no fluid pressure in back end chamber 128, first chamber 115, second chamber 116, pressure limiting chamber 90, and pressure limiting bore 98. There can be a means such as extension 102 intersecting the wall surrounding bore 98 or other suitable stop such as a retaining ring or step in the bore to stop the movement of the pressure limiting piston 93 toward the front end 104 of the housing. During manual braking, the gain valve piston 120 is stopped at a location so that there is a passage from the power steering pump 11, through pump line 25, inlet passage 130, first chamber 115, passage 136 in gain valve piston 120, and out of outlet passage 131 to power steering gear 15. In the embodiment shown in FIG. 4, there is an open path from inlet 130 through the first chamber, through front end opening 134, axial passage 137, radial passage 138, sidewall passage 139, second chamber 116, out of outlet 131 to communicate with line 18. In this way, if for some reason the power steering pump 11 would be restarted suddenly such as by starting a stalled engine while the manual braking mode is in effect, a sudden pressure buildup in the system would not occur. There would be no gap 59 to cause the pressure increase necessary in the hydraulic booster. Power steering would apply through passage 136, although the braking would remain in manual operation.

Therefore, there is a passage 136 opening, whenever the power steering pump 11 ceases to operate, as determined by the system pressure and piston spring 126. When the power steering pump 11 once again operates, the system, upon receiving pressure, automatically resets for power assist braking unless the return of the pump service is during a manual braking mode. When the power steering pump 11 ceases to operate and manual braking is taking place, the valves in the booster control portion 13 open and allow communication from pump 11, through pump line 25, booster control line 24, to booster line 53, booster side inlet 132, back end passage 140 and into back end chamber 128. The pressure in back end chamber 128 plus the force from the piston spring 126 toward the front end 104 of the gain valve housing 105 are greater than the force of the pressure in first chamber 115 from pump 11 and the force on the pressure limiting piston 93. The power steering pump 11 is set to operate at low pressures, typically about 50 pounds per square inch. This force difference across the gain valve piston 120 maintains it in the manual operating position with passage 136 open. Although the power steering pump 11 is operating, this is not a sudden return to power assisted braking.

When the pump 11 begins to operate and the brake pedal is released, the gain valve piston 120 hydrostatically repositions itself in the bore 111 for subsequent normal power assist mode braking performance of the hydraulic booster. Upon release of the brakes, valves in booster control portion 13 prevent fluid flow or pressure through booster line 53, to booster side inlet 132, back end passage 140 to back end chamber 128. An increased pressure from the power steering pump 11 through inlet 130 into first chamber 115 forces the gain valve piston 120 into a nonbraking, power assist position as shown in FIG. 2. The pressure from pump 11 through pump line 25, front inlet passage 130 and into first chamber 115 forces the gain valve piston 120 toward the back end 107 of the gain valve housing 105. This is because when the brake is released, the valves in booster control portion 13 close to communication between line 24 and line 53. The pressure in back end chamber 128 is relieved through the booster control portion 13. The gain valve piston 120 is then reset, or forced into position for power assisted braking, the next time the brakes are applied.

Therefore, the present invention provides a means which prevents the sudden application of the power assist mode should manual braking be in the process of being used and pressure is suddenly supplied to the system. This protects the passengers and equipment from the effects of sudden braking. Further, the power assist braking function is immediately available once the power steering pump is operating and the operator releases the manual mode braking. This is accomplished with a minimum amount of modification in the hydraulic booster design.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth therein but rather should be limited by the advance of which the invention has promoted the art.

What is claimed is:

1. A gain valve for a hydraulic booster, comprising:
a gain valve housing having a front end and a back end;
a first chamber disposed in the housing in spaced relation from the front end of the housing, there being a front inlet passage through the housing into the first chamber;
a second chamber coaxially connected to, and communicating with, the first chamber and extending therefrom towards the back end of the housing, the second chamber having a greater cross-sectional area then the first chamber, there being an outlet passage through the housing from the second chamber;
a gain valve bore coaxially connected to, and communicating with, the second chamber and extending therefrom towards the back end of the housing, there being a side inlet passage from the bore through the housing in spaced relation from the back end thereof;
a gain valve piston having a front end spaced from a back end and slidably located in the bore, the piston having a cross-sectional geometry enabling it to be slidably received in the second chamber and the first chamber and forming in at least the second chamber an annular opening through which fluid flows between the inlet and outlet passages of the first and second chambers, the piston being sized to close the annular opening as it enters the first chamber to block the flow of fluid through the opening, the piston having a back end chamber which extends longitudinally of the piston from the back end thereof and which has a back end inlet passage extending radially therefrom, the back end inlet passage being positioned to communicate with the side inlet passage in the bore, until the piston enters the first chamber;
a spring disposed in the back end chamber of the piston and coacting between the piston and back end of the housing to bias the piston towards the front end of the housing;
means, responsive to an increase of fluid pressure in the first chamber as the piston moves closer thereto, to stop movement of the piston towards the first chamber and prevent the piston from entering therein; and
means for maintaining the first chamber and front inlet passage thereof in fluid communication with the second chamber and outlet passage thereof when the fluid pressure in the first and second chambers decreases to a point where the biasing force of the spring moves the piston into the first chamber, said maintaining means including an opening in the front end of the piston in communication with the first chamber, the opening extending longitudinally into the piston from the front end thereof, and at least one radially oriented passage disposed in the piston and connecting the opening therein with the second chamber and outlet passage thereof, the radial passage of the piston being located so that it is sealed within the gain valve bore when the piston is outside the first chamber.

2. The gain valve as recited in claim 1 further comprising a means to seal between the gain valve piston and the gain valve bore wall between the front end and the back end of the gain valve piston.

3. The gain valve as recited in claim 2 wherein the gain valve bore is cylindrical having a diameter slightly greater than the diameter of the gain valve piston, the first chamber being cylindrical and having a diameter equal to the gain valve bore, and the second chamber having a greater geometric cross section than the first chamber.

4. The gain valve as recited in claim 1 wherein the means to stop movement of the piston includes:
a first chamber wall in the front of the first chamber;
a gain valve stem extending axially from the gain valve piston through a stem hole in the first chamber wall;
a pressure limiting piston, having a front portion and a back portion, the front portion passing slidingly through a pressure limiting bore through the back end of the gain valve housing, and the back portion of the pressure limiter is located in a pressure limiting chamber on the opposite side of the first chamber wall, the pressure limiting piston having a common axis with the gain valve stem, there being a pressure chamber passage through the gain valve housing to the pressure limiting chamber;
a means to bias the pressure limiting piston toward the front end of the gain valve housing;
a stopping means between the front portion and the back portion of the pressure limiting piston to prevent the pressure limiting piston from sliding through the pressure limiting bore and located so that during manual operation the gain valve piston sidewall opening is in communication with the second chamber.

5. The gain valve as recited in claim 4 wherein the stopping means is an extension from the piston wall which is in the pressure limiting chamber and intersects the wall surrounding pressure limiting bore when the pressure limiting piston slides toward the front end of the gain valve housing.

6. The gain valve as recited in claim 5 wherein the means to bias the pressure limiting piston includes a spray between the extension and the first chamber wall.

7. A gain valve of a booster for a fluid operated mechanism such as a power brake, comprising: a housing having at least three coaxially aligned communicating chambers, the second chamber between the first and third chambers having a greater diameter than the first and third chambers; a fluid inlet passageway in the first chamber and a fluid outlet passageway in the second chamber; a gain valve piston reciprocable in the third chamber and extending therefrom into the second chamber and forming with the second chamber an annular opening through which fluid passes between the passageways, the piston being capable of closing the opening as it enters the first chamber; means for biasing the piston in the direction of the first chamber; means coacting with the piston and responsive to an increase in fluid pressure in the first chamber as the piston approaches closer thereto, for limiting movement of the piston in the direction of the first chamber to prevent closure of the opening; and characterized by means for maintaining the passageways in fluid communication should the piston enter the first chamber and close the opening so that fluid is free to flow between the passageways.

8. The booster of claim 7, wherein the means for maintaining the passageways in fluid communication includes, a passage extending longitudinally within the piston in communication with the first chamber and fluid inlet passageway when the piston enters the first chamber, and at least one radially oriented passage in the piston between the longitudinal passage and second chamber, the radially oriented passage being located such that it will be sealed in the third chamber when the opening is open and not closed.

9. The booster of claim 8, wherein the means for limiting movement of the piston includes a fourth chamber in coaxial alignment with the first chamber and sealed therefrom, the fourth chamber being in farther spaced relation from the second chamber than the first chamber, a piston reciprocable in the fourth chamber and movable towards the first chamber in response to an increase of fluid pressure in the first chamber as the piston approaches closely thereto, means for biasing the piston in the fourth chamber in a direction away from the first chamber, and a stem extending from the gain valve piston in coaxial alignment therewith into the fourth chamber for contacting the piston in the fourth chamber upon predetermined relative movement of the pistons towards each other.

* * * * *